United States Patent [19]
Garner et al.

[11] Patent Number: 5,458,363
[45] Date of Patent: Oct. 17, 1995

[54] CYLINDRICAL INFLATOR RETAINER RING

[75] Inventors: Brett R. Garner, South Weber, Utah;
Marc D. Folsom, Mitaka, Japan;
Dwaine K. Palmer, Layton, Utah

[73] Assignee: Morton International, Inc., Chicago, Ill.

[21] Appl. No.: 260,586

[22] Filed: Jun. 16, 1994

[51] Int. Cl.⁶ .................................................. B60R 21/16
[52] U.S. Cl. ....................... 280/728.1; 280/732; 280/741
[58] Field of Search ............................. 280/728 A, 732, 280/741, 743 R, 728 R; 403/3.4

[56] References Cited

U.S. PATENT DOCUMENTS

| | | | |
|---|---|---|---|
| 2,834,606 | 5/1958 | Bertrand | 280/150 |
| 3,674,284 | 7/1972 | Lohr | 280/150 |
| 4,877,264 | 10/1989 | Cuevas | 280/731 |
| 4,913,461 | 4/1990 | Cuevas | 280/731 |
| 5,074,584 | 12/1991 | Jarboe | 280/743 |
| 5,193,846 | 3/1993 | Allard | 280/728 |
| 5,257,815 | 11/1993 | Bachelder et al. | 280/728 A |
| 5,356,175 | 10/1994 | Rose et al. | 280/728 A |

FOREIGN PATENT DOCUMENTS

| | | |
|---|---|---|
| 4205726A1 | 9/1992 | Germany . |
| 4205727A1 | 9/1992 | Germany . |
| 5193432 | 8/1993 | Japan | 280/728 A |
| 2265582 | 10/1993 | United Kingdom | 280/728 A |

OTHER PUBLICATIONS

English language abstract of DE 42 05 726 A1–Derwent Publications Ltd., 1992.
English language abstract of DE 42 05 727 A1–Derwent Publications Ltd., 1992.

*Primary Examiner*—Kenneth R. Rice
*Assistant Examiner*—Christopher Ellis
*Attorney, Agent, or Firm*—Nick C. Kottis; Gerald K. White

[57] ABSTRACT

A retainer for attaching an inflator having a substantially constant cross section to an air bag canister is disclosed. The retainer comprises a coupling ring having a first rim adjacent to one end of the coupling ring and a second rim adjacent to the other end of the coupling ring. A band having a diameter less than the diameter of the rims is formed by a gap between the two rims. The coupling ring is inserted over one end of the inflator and the inflator is installed into an air bag canister through an aperture in one end of the canister. The canister side wall surrounding the aperture is held between the two rims thereby coupling one end of the inflator to the canister. The other end of the inflator is secured to the canister by a mounting stud integral to the inflator which stud passes through an opening in the other side wall of the canister.

5 Claims, 3 Drawing Sheets

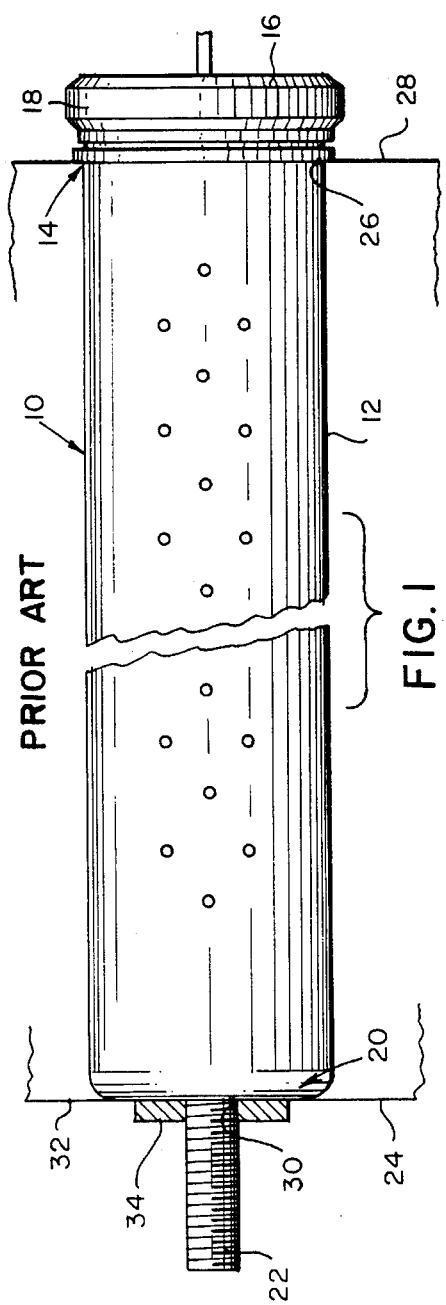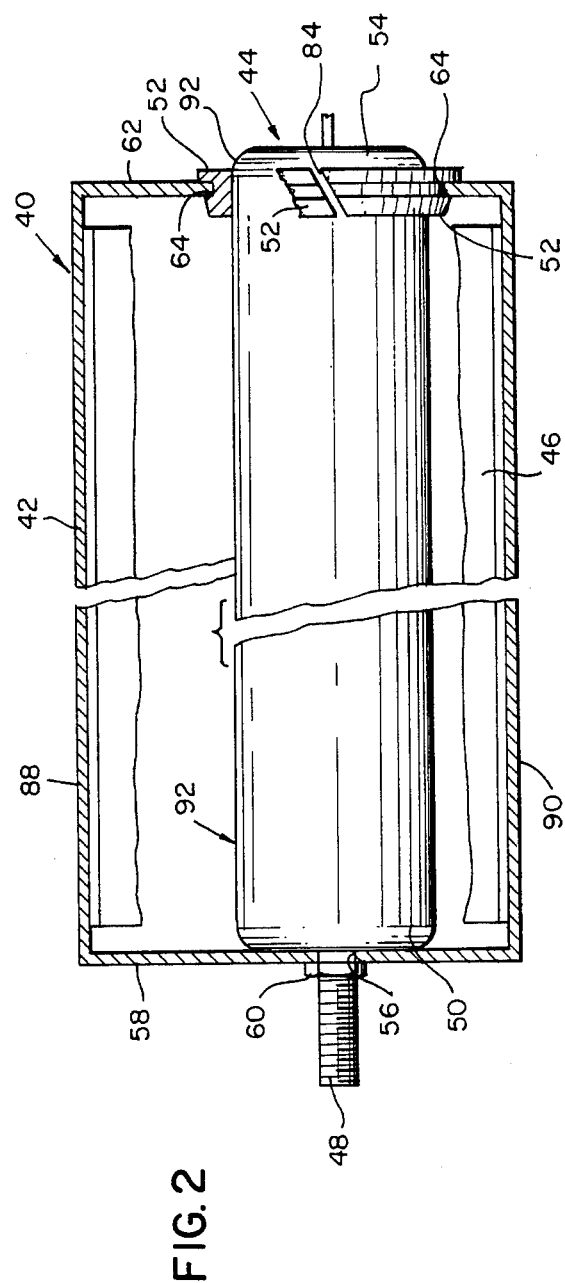

5,458,363

CYLINDRICAL INFLATOR RETAINER RING

BACKGROUND OF THE INVENTION

1. Field of the Invention

The present invention relates to an automotive safety device which, upon the onset of a collision, deploys an inflatable restraint cushion, commonly known as an air bag, so as to provide impact protection to occupants of the passenger vehicles. More particularly, this invention relates to a device for securing an inflator having a constant cross section to a passenger side air bag canister.

2. Description of Related Art

An air bag restraint system, referred to as a module, typically includes a canister which encloses a gas generator or, as it is commonly known, an inflator, and at least part of an air bag cushion, and a cover which conceals the module from view. When the vehicle is involved in a collision, a crash signal initiates operation of the inflator to cause the air bag cushion to deploy. The inflator produces an inert gas (e.g., nitrogen) which is directed under pressure into the air bag cushion to force it out of the canister incorporated into the module and into the passenger compartment of the vehicle. In a pyrotechnic-type inflator, gas is produced by the burning of a gas generating material. As the air bag cushion is forced out of the container, pressure exerted on the cover causes selected portions of the cover to separate in a predetermined manner along tear seams to enable the air bag cushion to be directed into the passenger compartment. As the air bag cushion is directed into the passenger compartment, it is inflated by the continued flow of gas produced by the inflator. One possible location for an air bag assembly is in the instrument panel or dashboard on the passenger side of the vehicle.

A standard pyrotechnic inflator 10 is shown in FIG. 1. The inflator 10 has an elongated tubular structure 12 with an open end 14 which is sealed with an end cap 16 having a flange 18, and a closed end 20 having an integral mounting stud 22 for attaching the inflator 10 to a canister 24. The overall length of the inflator 10 is greater than the length of the canister 24. The pyrotechnic inflator 10 is installed in the canister 24 by passing the inflator 10 through an opening 26 in the first side wall 28 and inserting the mounting stud 22 through an aperture 30 formed in the second side wall 32 of the canister 24 and securing the mounting stud 22 with a nut 34. The flange 18 is thereby engaged with the opening 26 to secure both ends of the inflator 10. As passenger side inflator designs are modified to provide better performance at a reduced cost, the outward appearance and the procedure for installing the inflator may be changed. In one design, the mounting flange 18 is eliminated to form an inflator 10 having a substantially constant diameter to improve performance and the structural integrity of the inflator 10. With this modification, attachment of the passenger side inflator to conventional air bag canisters may not be possible.

A possible solution is shown by Good, U.S. Pat. No. 5,069,480, wherein a recessed boss is provided for accepting the sealed end of an inflator. This design requires modification of the canister end panel thus requiring substantial retooling. Further, the recessed boss must be sized for one specific inflator diameter, thereby causing extensive changes should the inflator diameter be changed.

A second possible solution is shown in Jarboe et al., U.S. Pat. No. 5,197,756, wherein a sleeve having diametrically opposed flanges that extend outwardly of the sleeve is attached to a tongue formed into the air bag canister. The sleeve is connected to the inflator housing by press fit, shrink fit, or tongue-and-groove techniques. This design requires a specifically designed air bag canister. Further, the sleeve must be sized for each inflator.

SUMMARY OF THE INVENTION

An object of this invention is to provide a one-piece retainer means for attaching an inflator having a substantially constant cross section to an air bag canister without the use of fasteners or the like.

Another object of this invention is to provide a retention means which positions the end of the inflator while providing longitudinal and radial retention of the inflator and reduces rattling due to vibration.

Another object of this invention is to provide sufficient access to the inflator for use with squib connectors.

These and other objectives of the invention, which will become apparent from the following description, have been achieved by a novel coupling ring for attaching an elongated tubular gas generator, having a substantially constant circular cross-section, to an aperture formed into the side of an air bag canister. The coupling ring with an internal diameter slightly less than the diameter of the tubular gas generator is inserted over one end of the gas generator. At least two rims are formed on the outer perimeter of the coupling ring. A first or outer rim adjacent to one end of the coupling ring has a diameter greater than the diameter of the canister side aperture. A second or inner rim adjacent to the other end of the coupling ring also has a diameter greater than the diameter of the canister side opening, but less than the diameter of the outer rim. Between the first and second rim is a gap. The diameter of the coupling ring at the location of the gap is less than the diameter of the canister side opening. When the gas generator, with the coupling ring attached, is inserted through the side opening of the canister, the inner rim of the coupling ring deforms slightly to permit the section of the canister adjacent to the side aperture to be contained between the inner and outer rims. To make the installation of the coupling ring onto the gas generator easier, a slit or cut may be made through the side wall of the coupling ring from one side of the coupling ring to the other, in order to allow the coupling ring to expand when inserted onto the gas generator.

BRIEF DESCRIPTION OF THE DRAWINGS

With this description of the invention, a detailed description follows with reference being made to the accompanying figures of drawings which form part of the specification related thereto, in which like parts are designated by the same reference numbers, and of which:

FIG. 1 is a fragmented side plan view illustrating a conventional passenger side inflator;

FIG. 2 is a fragmented top plan view illustrating the retainer of the present invention in use with a gas generator and air bag canister;

DETAILED DESCRIPTION OF THE INVENTION

Figure 3A:
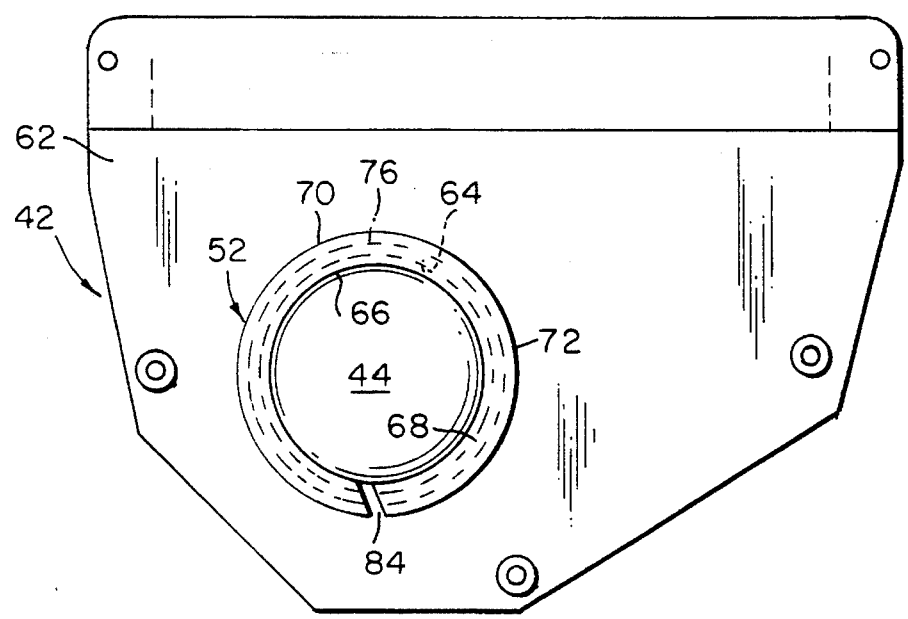
FIGS. 3a and 3b are an end view and a detailed cross-sectional view of the retainer end of FIG. 2 illustrating the retainer, gas generator, and side panel of the air bag canister.

Referring to FIG. 2, an air bag assembly is shown generally at 40 comprising a canister 42 containing an improved gas generator 44 having a substantially constant diameter, and an air bag cushion 46. The air bag cushion 46 is shown in fragmented view in order to simplify the drawing. The improved gas generator 44, the overall length of which is greater than the length of the canister 42, is held in place in the canister 42 by a mounting stud 48 integral to the first end 50 of the gas generator 44 and the coupling ring 52 of this invention inserted over the second end 54 of the improved gas generator 44. The mounting stud 48 is inserted through a first aperture 56 formed in the first end wall 58 of the canister 42 and is secured with a nut 60. The second end 54 of the improved gas generator 44 is secured to that section of the canister second end wall 62 adjacent to the second aperture 64 by the coupling ring 52. The improved gas generator 44 for use with this invention can be of pyrotechnic, hybrid or stored gas types, as known in the art, and modified as described herein.

Figure 3B:
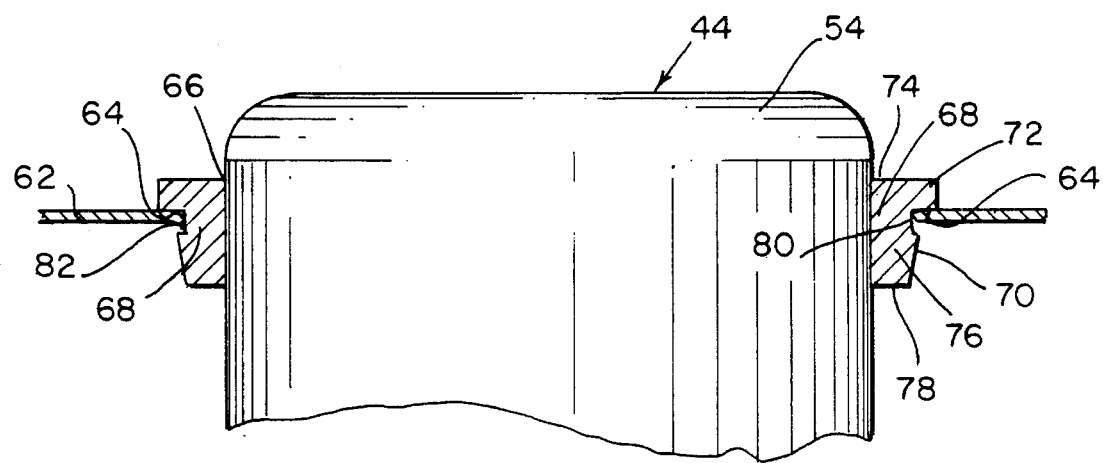

The coupling ring 52, as shown in FIGS. 3a and 3b, has an inner aperture 66, a side wall 68, and an outer surface 70 having a circular cross section. A first rim 72 integral to the outer surface 70 is in spaced relation to the first surface 74 of the coupling ring 52 and a second rim 76, also integral to the outer surface 70 of the coupling ring 52, is in spaced relation to the second surface 78 of the coupling ring 52. The first rim 72 has an outer diameter greater than the diameter of the second aperture 64 formed in the canister second wall 62. The second rim 76 has a diameter greater than the diameter of the second aperture 64 and less than the outer diameter of the first rim 72.

Figure 4:
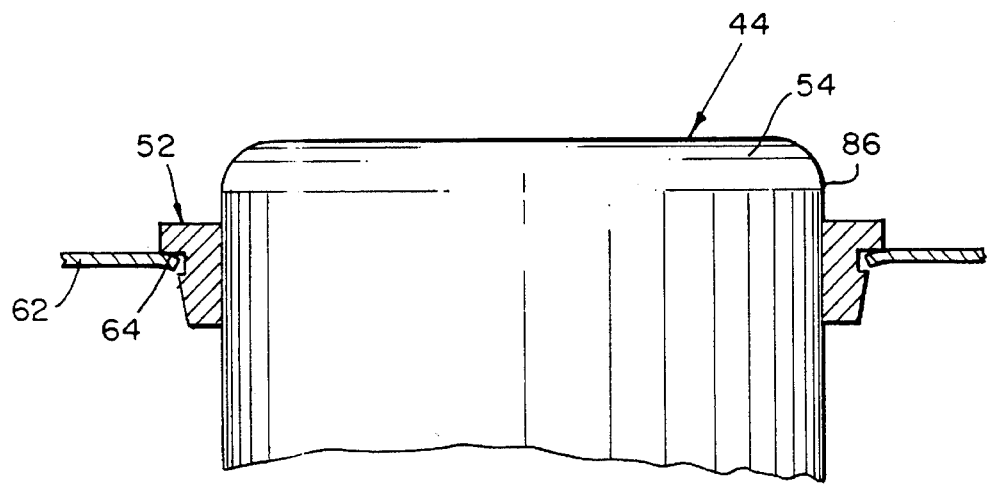
FIG. 4 is a cross-sectional view illustrating the coupling ring with a slightly irregular gas generator.
Figure 5:
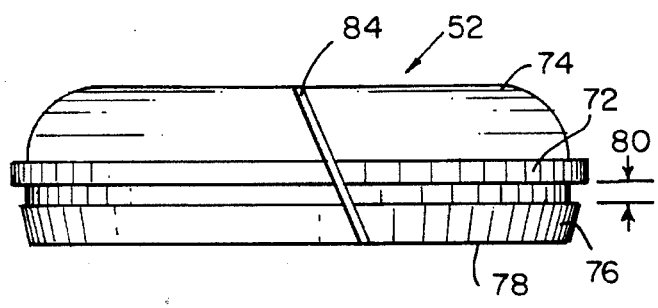
FIG. 5 is a side plan view of a modified coupling ring of the present invention.
Figure 6:
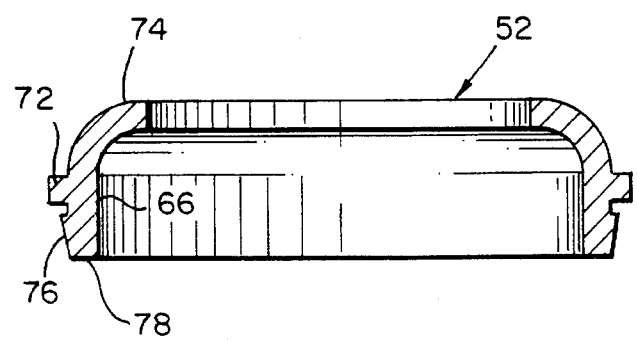
FIG. 6 is a cross-sectional view of an alternate coupling ring of FIG. 5.

Between the first rim 72 and the second rim 76 is a gap 80 that defines a central band 82. That section of the canister second end wall 62 adjacent to the second aperture 64 is held in the gap 80 between the first rim 72 and the second rim 76. To improve the ease of installation of coupling ring 52 onto the second end 54 of the improved gas generator 44, a slit 84, as shown in FIGS. 1 and 3a, may be formed into the side wall 68 of the coupling ring 52. The slit 84 also gives flexibility to the coupling ring 52 to compensate for slight variations in the outer wall 86 of the improved gas generator 44 adjacent to the second end 54, as shown in FIG. 4. Further, the top surface 74 may be contoured to the shape of the gas generator second end 54, as shown in FIGS. 4 and 5, to provide longitudinal retention of the improved gas generator 44. The coupling ring 52 may be formed from any semi-rigid material having sufficient flexibility to deform around the second end 54 of improved gas generator 44. Examples of suitable materials, but not limited to, are nylon, nylon 66 polyethylene, polypropylene and aluminum.

The canister 42 for use with the coupling ring 52 of this invention comprises a top wall 88 and a bottom wall 90 (when viewed from above), as shown in FIG. 2, and first end wall 58 and second end wall 62. A first aperture 56 is provided in the first end wall 58 to accept the mounting stud 48. A second aperture 64 is formed in the canister second wall 62. The canister may be formed from carbon steel or stainless steel.

During assembly of the passenger side air bag module 40 the coupling ring 52 of this invention is attached to the second end 54 of the improved gas generator 44 such that surface of the inner aperture 66 engages with the outer surface 92 of the improved gas generator 44 adjacent to the second end 54. The improved gas generator 44 is inserted through the second aperture 64 and into the canister 42 such that the mounting stud 48 passes though the first aperture 56 and is secured with the nut 60. The coupling ring 52 secures the improved gas generator 44 to the second end wall 62 as described hereinabove.

Thus, in accordance with the invention, there has been provided a one piece retainer means for attaching different inflator designs to an air bag canister. There has also been provided a retainer means which positions the end of the inflator while providing longitudinal and radial retention of the inflator thereby eliminating rattling due to vibration while providing sufficient access to the inflator for use with squib connectors.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

We claim:

1. A combination comprising:

an elongated tubular gas generator having a substantially constant diameter, said gas generator having a smooth outer surface, a first end, and a second end;

an air bag canister having a first end wall and a second end wall and defining a cavity for said gas generator and at least part of a folded automotive air bag cushion, said second end wall having a second aperture therein having a diameter greater than the diameter of said gas generator, said gas generator being actuable to generate a gas under a pressure in said cavity; and a coupling ring having an outer wall, a first surface defining a first end and a second surface defining a second end, said first surface and said second surface being substantially parallel to one another, said first and second surfaces having circular cross-sections, a first rim adjacent to said first surface, a second rim adjacent to said second surface, and an internal aperture having a diameter less than the diameter of said gas generator, said first rim having an outer diameter which is greater than the diameter of said second aperture, said second rim having a second outer diameter which is greater than the diameter of said second aperture and less than the outer diameter of said first rim, and an indentation between said first rim and said second rim, said indentation defining a diameter which is less than said outer diameter of said second rim;

wherein said second end of said gas generator is inserted through said second end of said coupling ring such that said coupling ring is inserted onto said second end of said gas generator, and said gas generator and coupling ring are inserted into said air bag canister through said second aperture such that said canister second end wall is contained between said first rim and said second rim thereby holding said gas generator to said canister.

2. The combination of claim 1 wherein said coupling ring further comprises a slit through said outer wall from said first surface to said second surface thereby permitting said coupling ring to expand when inserted onto said gas generator.

3. The combination of claim 1 wherein said first surface of said coupling ring comprises a gas generator adjacent inner surface contoured to the shape of the gas generator second end.

4. The combination of claim 1 wherein said coupling ring is tapered from said first surface to said second surface.

5. The combination of claim 1 wherein said coupling ring is made from a material selected from a group consisting of nylon, nylon 66, polyethylene, polypropylene and aluminum.

* * * * *

UNITED STATES PATENT AND TRADEMARK OFFICE
CERTIFICATE OF CORRECTION

PATENT NO. : 5,458,363
DATED : October 17, 1995
INVENTOR(S) : Brett R. Garner et al.

It is certified that error appears in the above-indentified patent and that said Letters Patent is hereby corrected as shown below:

At column 3, line 35, "rim 76 has a diameter" should be
--rim 76 has an outer diameter--.

At column 3, line 49, "the top surface 74" should be
--the first surface 74--.

Signed and Sealed this

Twenty-fifth Day of June, 1996

Attest:

BRUCE LEHMAN

*Attesting Officer*  *Commissioner of Patents and Trademarks*